Aug. 20, 1957 H. L. McFEATERS 2,803,450

CONVERTER GAS CLEANING SYSTEM

Filed Sept. 29, 1953 12 Sheets-Sheet 1

INVENTOR.
Harry L. McFeaters
BY Green, McCallister & Miller
HIS ATTORNEYS

INVENTOR.
Harry L. McFeaters
BY Green, McCallister & Miller
HIS ATTORNEYS

Aug. 20, 1957 H. L. McFEATERS 2,803,450

CONVERTER GAS CLEANING SYSTEM

Filed Sept. 29, 1953 12 Sheets-Sheet 3

INVENTOR.
Harry L. McFeaters
BY Green, McCallister & Miller
HIS ATTORNEYS

Aug. 20, 1957 H. L. McFEATERS 2,803,450

CONVERTER GAS CLEANING SYSTEM

Filed Sept. 29, 1953 12 Sheets-Sheet 4

INVENTOR.
Harry L. McFeaters
BY Green, McCallister & Miller
HIS ATTORNEYS

Aug. 20, 1957 H. L. McFEATERS 2,803,450

CONVERTER GAS CLEANING SYSTEM

Filed Sept. 29, 1953 12 Sheets-Sheet 5

INVENTOR.
Harry L. McFeaters
BY Green, McCallister & Miller
HIS ATTORNEYS

INVENTOR.
Harry L. McFeaters
BY Green, McCallister & Miller
HIS ATTORNEYS

CONVERTER GAS CLEANING SYSTEM

Filed Sept. 29, 1953 12 Sheets-Sheet 7

INVENTOR.
Harry L. McFeaters
BY Green, McCallister & Miller
HIS ATTORNEYS

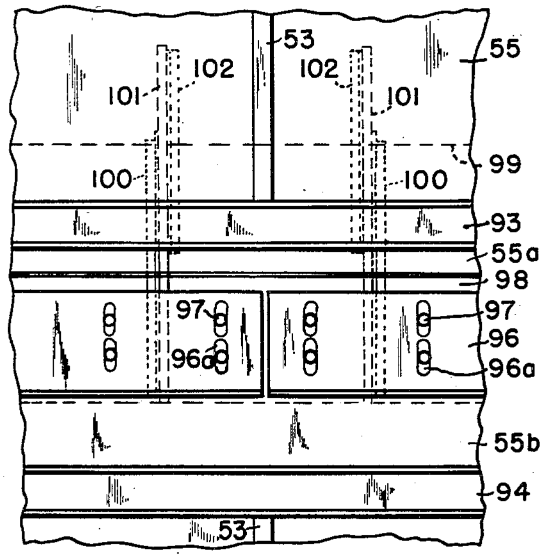
Fig. 10
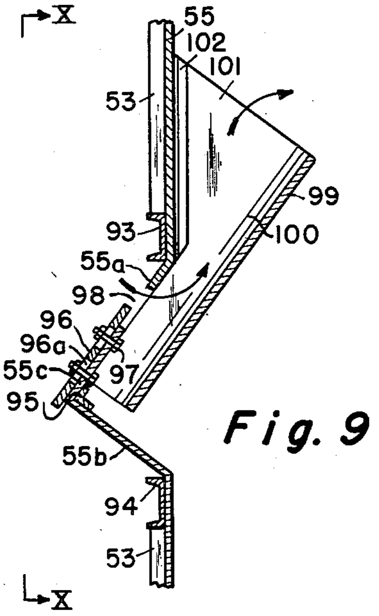
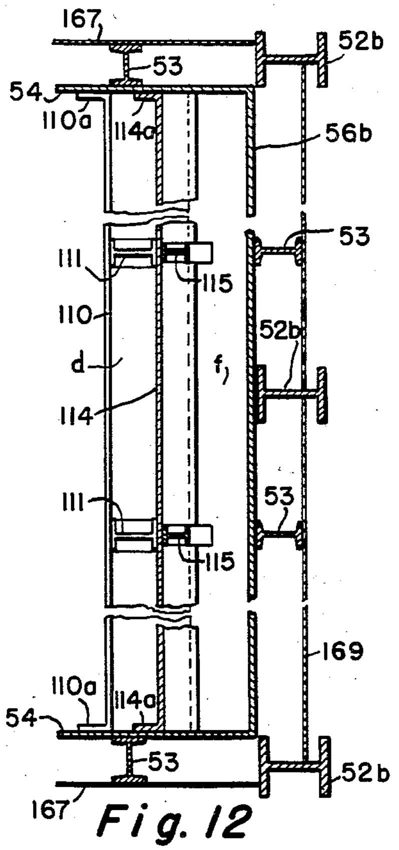
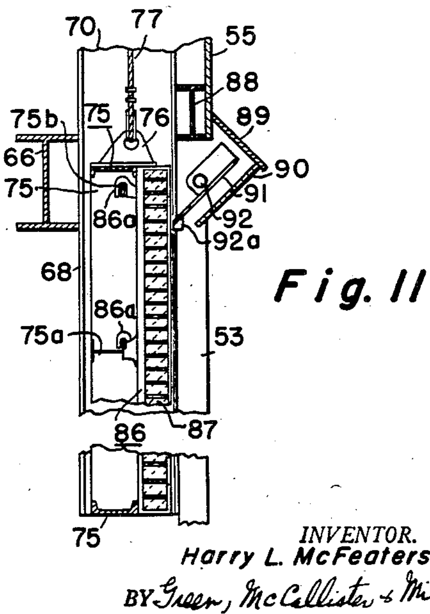
Fig. 11
INVENTOR.
Harry L. McFeaters
BY Green, McCallister & Miller
HIS ATTORNEYS INVENTOR.
Harry L. McFeaters
BY Green, McCallister & Miller
HIS ATTORNEYS INVENTOR.
Harry L. McFeaters
BY Green, McCallister & Miller
HIS ATTORNEYS

ELECTRIC PUSH BUTTONS

| | | |
|---|---|---|
| Converter | ● | Blow Position |
| | ● | Charging Pos. |
| | ● | Dumping Pos. |
| | ● | Stop |
| Converter Buggy Drag Out | ● | In |
| | ● | Out |
| | ● | Stop |
| Hot Metal Ladle Transfer Car Drag Out | ● | In |
| | ● | Out |
| | ● | Stop |
| Door | ● | Up |
| | ● | Down |
| | ● | Stop |
| Conveyor Drive Under Spittle Hoppers | ● | Start |
| | ● | Stop |
| Secondary Vent Fans | ● | On — Right Side |
| | ● | Off — Right Side |
| | ● | On — Left Side |
| | ● | Off — Left Side |
| Jack Car Drive | ● | Forward |
| | ● | Reverse |
| | ● | Stop |
| Converter Air Supply | ● | On |
| | ● | Off |
| Induced Draft Fan (Two) | ● | On |
| | ● | Off |

AIR CONTROLS

| | |
|---|---|
| Blast Gate Under Spittle Hopper | Neutral; In; Out |
| Hot Metal Runner and Scrap Chute Buggy | Hot Metal Runner on ℄ Converter; Neutral; Scrap Chute on ℄ Conv. |
| Scrap Chute | Neutral; Up; Down |
| Hot Metal Runner | Neutral; Up; Down |
| Dust Bin Blast Gate Cylinder | Neutral; In; Out |

Fig. 15

INVENTOR.
Harry L. McFeaters
BY Green, McCallister & Miller
HIS ATTORNEYS

INVENTOR.
Harry L. McFeaters
BY Green, McCallister & Miller
HIS ATTORNEYS.

United States Patent Office 2,803,450

Patented Aug. 20, 1957

2,803,450

CONVERTER GAS CLEANING SYSTEM

Harry L. McFeaters, New Castle, Pa., assignor to Pennsylvania Engineering Corporation, New Castle, Pa., a corporation of Pennsylvania Application September 29, 1953, Serial No. 383,094

16 Claims. (Cl. 266—13)

This invention relates to a new and improved converter vessel operating layout and particularly, to a handling and cleaning system for atmospheric discharges therefrom. A phase of the invention involves processing and the utilization of a processing enclosure for the hot contaminant-laden discharge from the mouth of a generator such as a Bessemer converter installation to cloak its flame and to avoid atmospheric air contamination from its gas, fume and smoke discharge.

It is today recognized that the health, growth and general well-being of a community is influenced by a clean, smog and industrial waste-free atmosphere. In fact, many communities and industrial areas now have so-called smoke-control laws which require the taking of effective measures in this connection.

Since gases discharged from the mouth of acid or basic converters for molten metal are laden with considerable dirt which contains metalloids, graphite, etc., some communities have gone so far as to forbid their installation.

There has thus been an important need for a practical installation or system for eliminating air contamination by a converter and also for cloaking and hiding its flame. The latter is particularly important from the standpoint of national defense, due to the night visibility of such a flame, and the ease of spotting it by airplane.

I have found that the problem involved in this connection is complicated by the relatively high temperature of the converter gaseous or fume discharge, by the volume of the gases evolved, by the need for properly introducing atmospheric air into and in a large quantity or volume to the discharge, by the combustible content of the discharge, by the flame discharge from the converter, by the carbon monoxide discharge, by the variations in size, type and quantity of particles in the fume or gaseous discharge, by the relatively high concentration of air contaminants discharged, by the need for a low maintenance cost, and by the need for a graduated and substantially complete separation of the air contaminating materials. In general, I determined that the need is for a highly practical, foolproof, easily and inexpensively maintained system that will stand up and efficiently operate under the high temperatures involve and that will provide a practical and simplified separating out and collection of the waste or air contaminating materials.

It has thus been an object of my invention to devise a practical and efficient solution to the problem involved;

Another object has been to determine factors that are involved and how they have to be controlled both individually and in combination to develop a structural layout and treatment system or method to meet the need;

A further object has been to provide a practical embodiment of my inventive discoveries;

A still further object has been to provide apparatus for receiving, containing and processing all the gaseous, fume, smoke and flame discharge from a converter;

These and other objects of my invention will be apparent to those skilled in the art from the following description of an illustrated embodiment thereof.

In the drawings:

Figures 1 and 1A may be put together to show the complete side structural arrangement;

Figure 1:
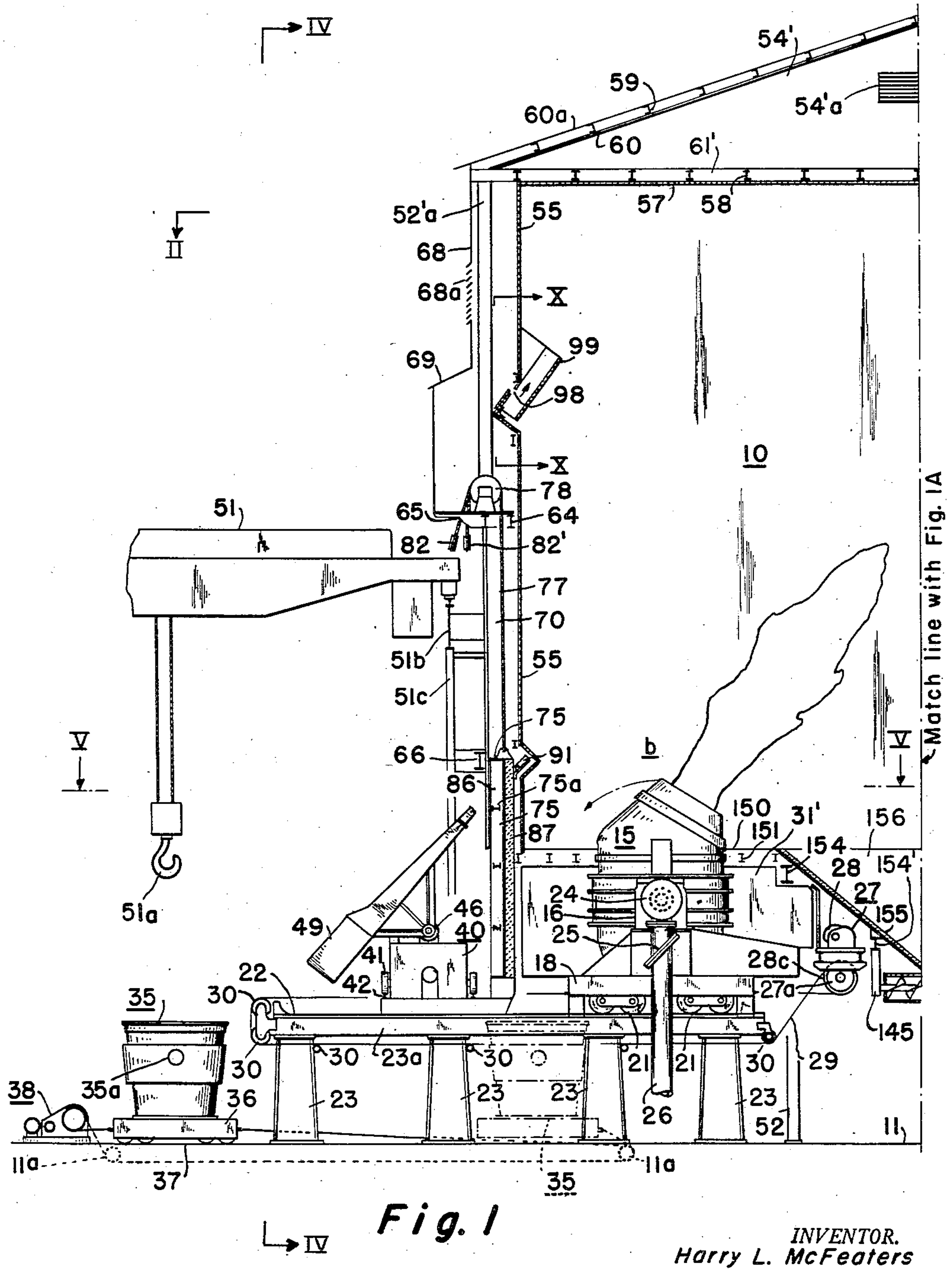
Figure 1 is a side view in elevation of an apparatus system employing the principles of my invention; this view represents a left half portion of the apparatus taken along the line I—I of Figure 2 and with a side enclosure plate lining or sheathing removed.
Figure 1A:
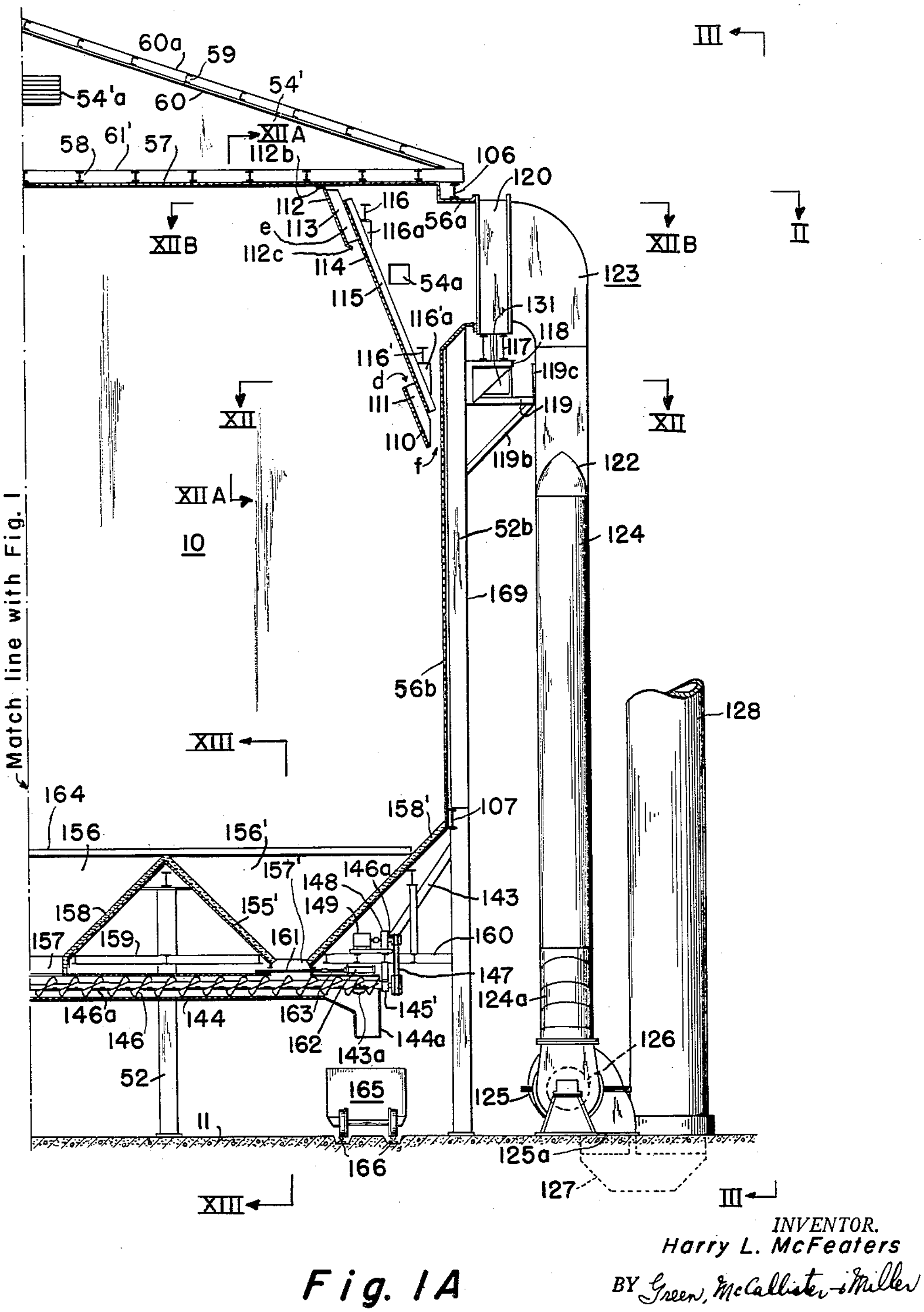
Figure 1A is on the same scale of Figure 1 and is of the same type as Figure 1, except that it shows the other (right) half portion of the apparatus and is taken along the line IA—IA of Figure 2.
Figure 2:
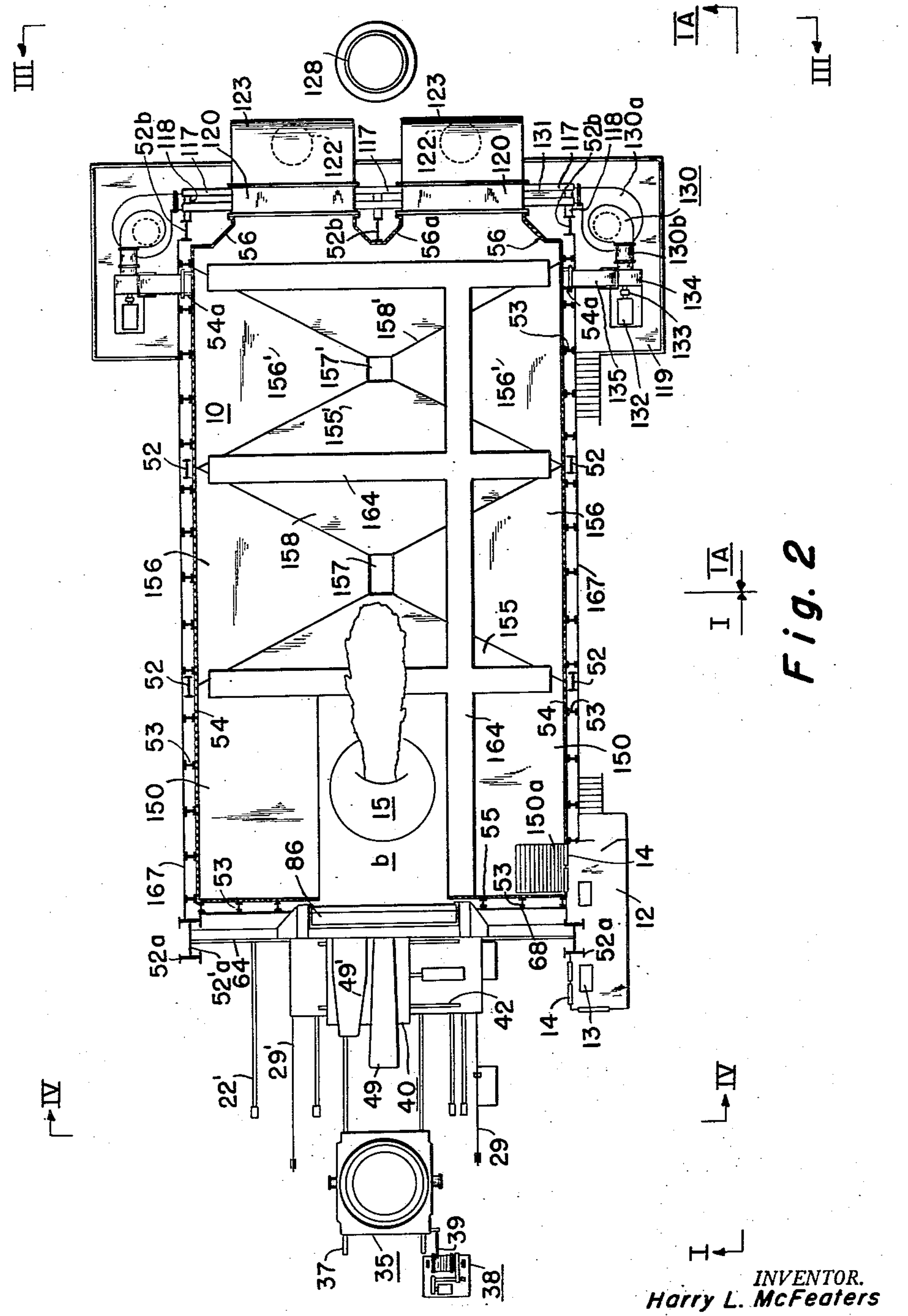
Figure 2 is a reduced horizontal top view taken along the line II—II of Figures 1 and 1A and showing the apparatus of such figures with portions omitted for clarity.
Figures 4, 4A:
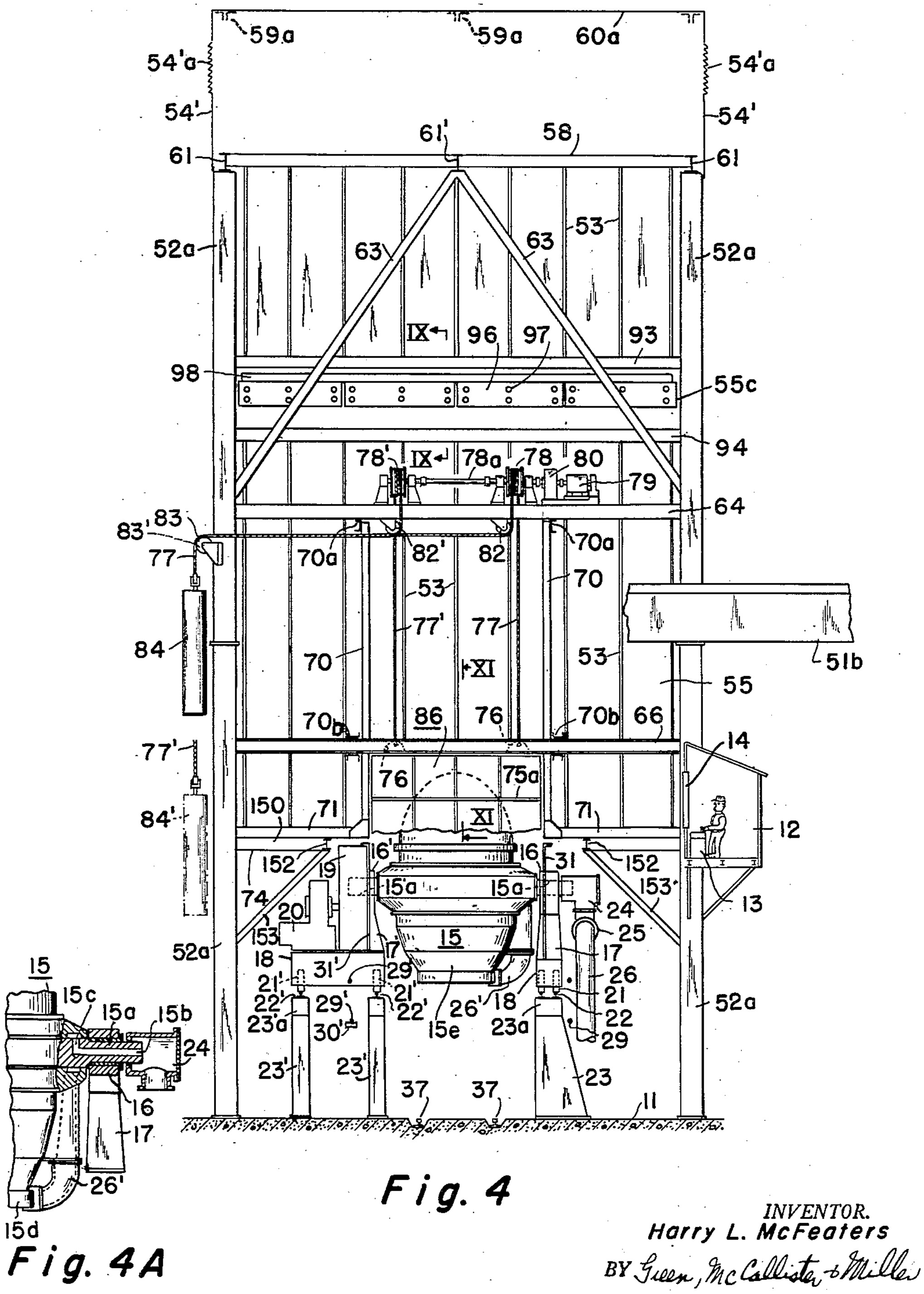
Figure 4 is a front end view in elevation on the scale of Figure 3 and taken in the direction of the lines IV—IV of Figures 1 and 2.
Figure 4A is an enlarged fragment in partial section showing details of blower air connections to the converter.
Figure 5:
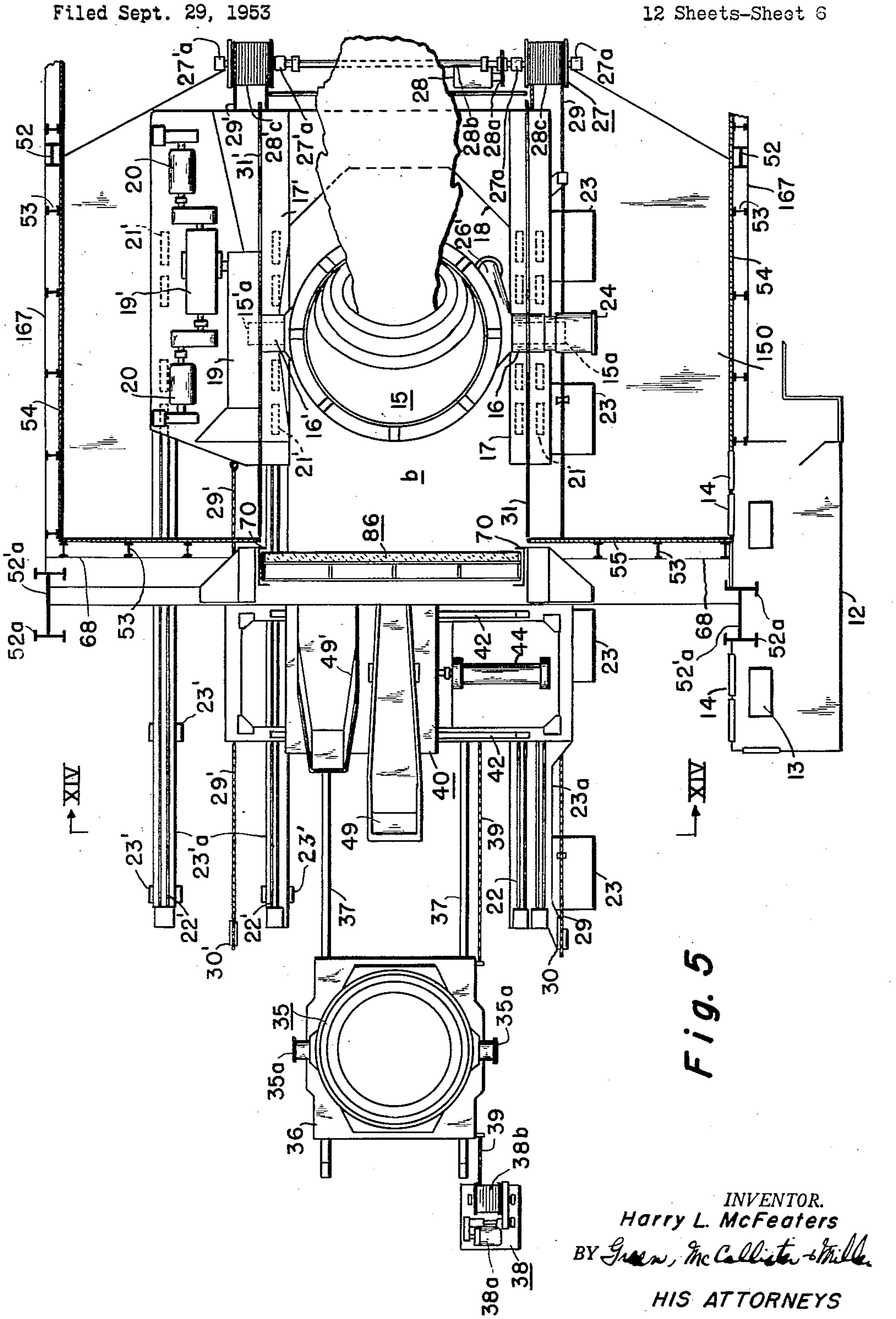
Figures 6, 7, 8:
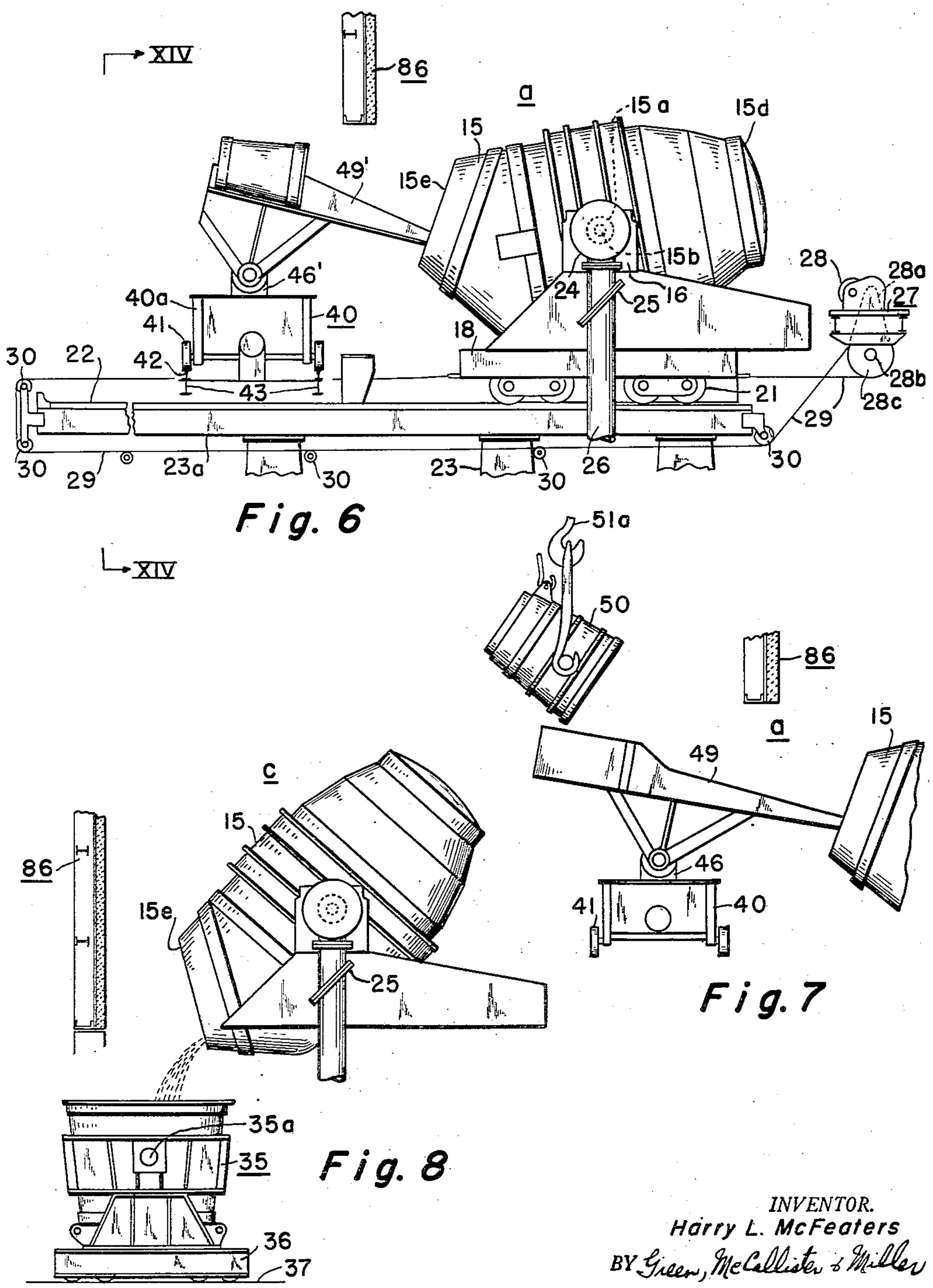
Figures 12A, 12B:
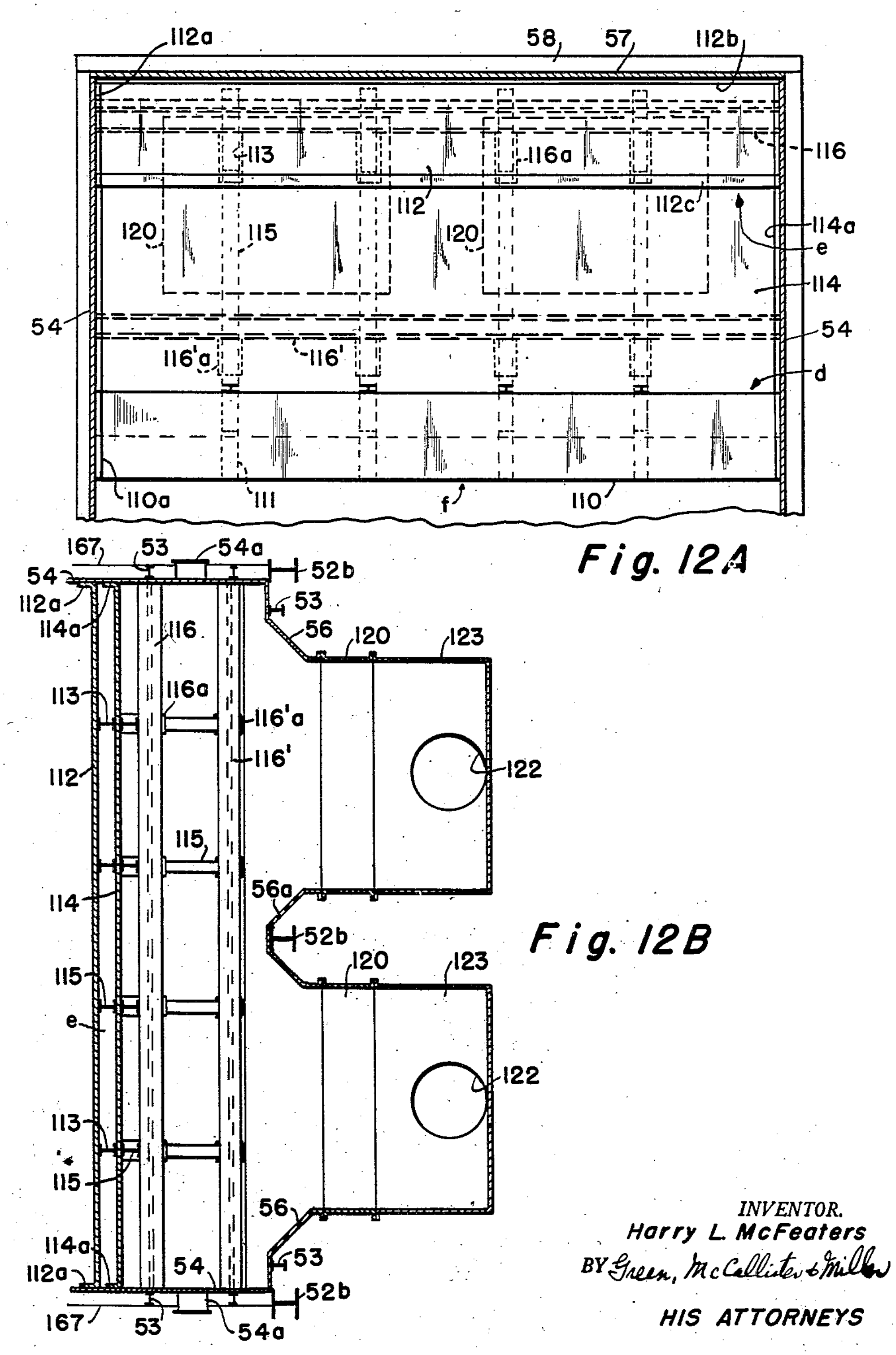
Figure 13:
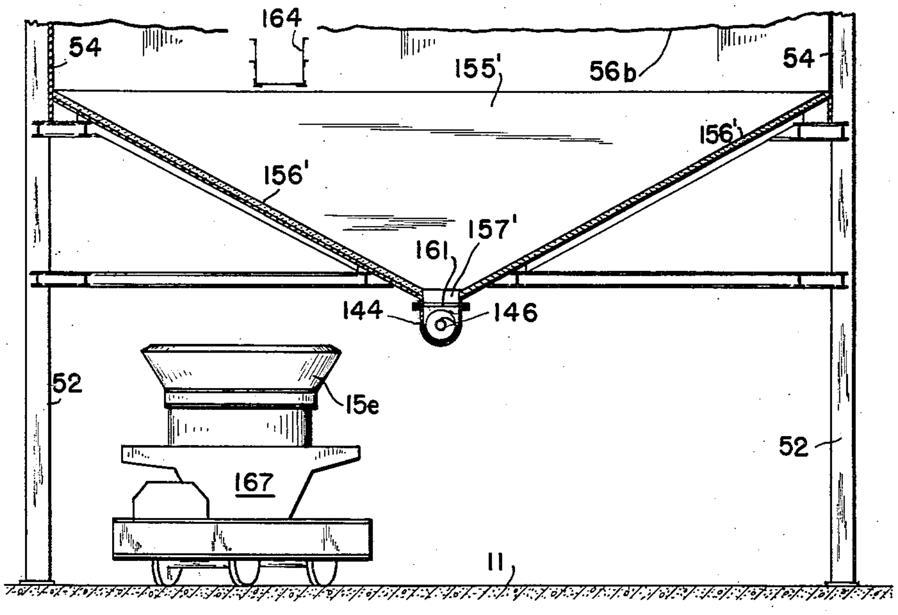
Figure 14:
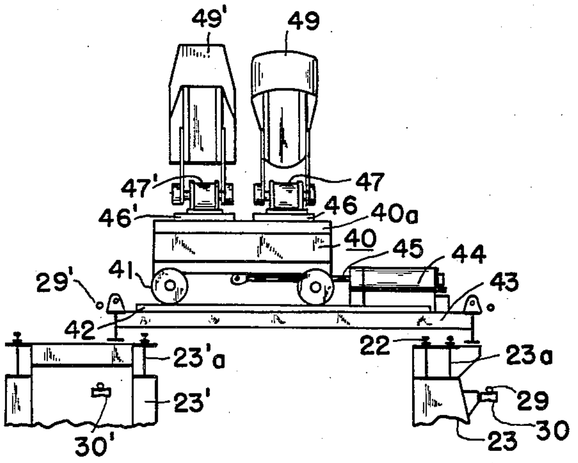
Figure 16:
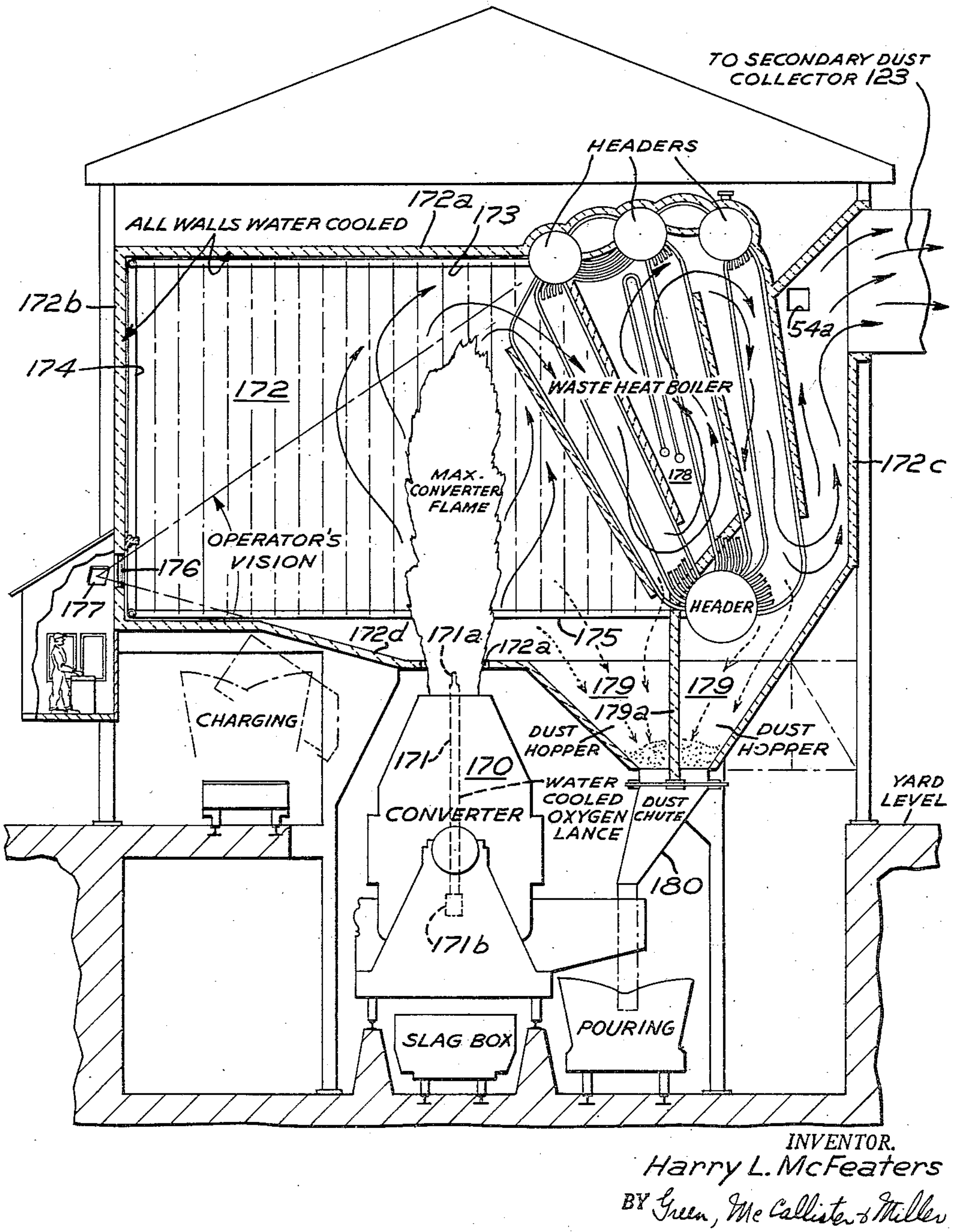

Figure 5 is a fragmental top horizontal view taken from the front end of the apparatus system of my invention disclosed in Figure 2, taken along the line V—V of Figure 1, and of an enlarged scale with respect to Figure 1; this view particularly illustrates a converter charging apparatus and a charge receiving apparatus employed with a cleaning apparatus as disclosed in the previously mentioned figures;

Figure 6 is a fragmental side view in elevation taken from the front end of the construction and on the same scale as Figure 5, to illustrate apparatus for and the operation of charging the converter, when it has been turned to a charging position, and a charging door for the cleaning enclosure has been opened or raised;

Figure 7 is a side fragmental view in elevation on the scale of Figure 6 and illustrating how molten metal is supplied to the charging apparatus of Figure 6;

Figure 8 is a fragmental side view in elevation on the scale of Figure 7 illustrating a further operation of discharging converter metal to a ladle cart;

Figure 9 is a greatly enlarged side sectional view in elevation showing a pivoted louver construction for aspirating air into the cleaning chamber and is taken along the line IX—IX of Figure 4;

Figure 10 is a fragmental front end view in elevation taken along the line X—X of Figure 1 and in the direction of the line X—X of Figure 9 and on the same scale as such figure;

Figure 11 is a fragmental side sectional view in elevation on the scale of Figures 9 and 10, taken along the line XI—XI of Figure 4, and illustrating a furnace door construction and scraping means therefor;

Figure 12 is a fragmental horizontal section on the enlarged scale of Figure 11 and taken along the line XII—XII of Figure 1A to illustrate the construction of a back end discharge baffling for the gases;

Figure 12A is a slightly enlarged fragmental vertical section taken on the line XIIA—XIIA of Figure 1A and Figure 12B is a horizontal section of the same scale and taken along the line XIIB—XIIB of the same figure; these views further illustrate the baffling of Figure 12 and its mounting structure;

Figure 13 is an enlarged end section in elevation and taken along the line XIII—XIII of Figure 1A to particularly illustrate the bin or chute-like hopper floor construction of the cleaning enclosure as well as the employment of operating spacing provided below the enclosure;

Figure 14 is a fragmental front end view in elevation on the scale of Figure 13 and taken in the direction of the line XIV—XIV of Figure 5 to further illustrate the construction and mounting of scrap and molten metal charging apparatus for the converter, see also Figure 6;

Figure 15 is a diagrammatic chart showing electrical push button and air controls which are provided in a control house of the system to enable one operator to regulate various operations involved in charging and utilizing the cnnverter, in cleaning the gaseous flame and fume exhaust therefrom, as well as handling waste materials which are removed from the gaseous converter discharge before cleaned gases are discharged into the atmosphere; and Figure 16 is a somewhat diagrammatic side view in elevation of a modified apparatus system of my construction; this view, like Figures 1 and 1A, is taken as a side section through an enclosure for the system shown.

In endeavoring to find a solution for the problem presented in connection with the processing, handling and cleaning of a converter discharge, I have found that there are two important factors which must first be met. The first factor arises from the nature of the atmospheric discharge from the converter and the second arises from the relatively high temperature and heat content of such discharge.

As to the first factor, a normal iron charge in a 25 ton converter will produce effluent gases consisting of about 40,320 cubic feet of $N_2$ during the first two minutes of the silicon blow. The next 8 minutes will produce about 15,000 cubic feet of $CO_2$, about 44,800 cubic feet of CO plus about 161,800 cubic feet of $N_2$. The average volume of gas escaping will be about 26,000 cubic feet per minute. It will be understood that about one-fourth of the carbon in the melt burns to $CO_2$ in the converter; the other three-fourths of the carbon burns to CO in the converter and is then discharged as such to the atmosphere. In an open converter utilization, this discharged CO is what produces the long flame as it burns in the atmosphere to $CO_2$. The above figures are based on a normal pig iron containing about 4% carbon, 1% silicon and 1% manganese. In such a melt, about 5% of the iron will burn to FeO as the normal yield of the metal is about 88%. The gas volumes were calculated at standard conditions.

The gases from the converter will also contain considerable amounts of the metal vapors, such as iron and manganese, that produce a fume with small particles, since the metal vapors in the fume or gaseous discharge will tend to oxidize into metal oxides. The very fine metal particles thus thrown out of only a few microns in size complicate the cleaning operation and it was felt that only electrostatic precipitator equipment would be effective to catch such fine material. However, I determined that the initial cost and maintenance of presently available precipitator equipment is prohibitive for a system of the type here involved and particularly so from the standpoint of the large volume of gases that are to be processed.

I have found that this particular factor arises in connection with various types of melts and particularly, from the standpoint of the volume of gases produced, the production of CO and of metal vapors. A typical melt has been employed for the purpose of illustrating the problem.

In a closed chamber, I have determined that the discharged CO should be burned in the same manner as in an open discharge and that metal vapors should also be oxidized, in that any attempt to cloak this normal effect will give rise to additional problems and endanger the operation. In this connection, I have found that it is important to so conduct the cleaning operation that the converter will be able to operate in its normal manner for maximum efficiency and without detrimental effects upon its operation. For example, if the CO and the metal vapors are not burned from the effluent gases, a highly explosive mixture is produced and difficulty is later encountered in the cleaning operation. This is true, although such burning and oxidizing action adds to the total heat content, requires additional oxygen or air, and further raises the temperature. In this connection, the CO gas will constitute about 20% to 25% by volume of the escaping gas and should be burned before it hits the cleaner.

As to the second factor, employing a safe calculation of about 260,000 cubic feet of gas for each 10 minutes blow, this produces a sensible heat content of about 12 million B. t. u. at a temperature of about 2700° F. The CO in the effluent gases on burning will develop about another 15 million B. t. u. per 10 minute blow. For four blows per hour, the total available heat per hour is thus about 109 million B. t. u. It is thus apparent that the temperature of the effluent gases and the high heat content thereof is an important consideration or factor in meeting the problem involved.

In this connection, I have determined that for an efficient cleaning action, such gases should be reduced to a temperature of about 600° F., both to prevent damage to the cleaning apparatus and to provide an effective separating-out of the contaminants including metalloids, etc. It is thus necessary to provide an effective cooling system for the effluent gases which will bring them down to a practical separating temperature before they are introduced into the cleaning apparatus. The heat content of these gases at 2700° F. is about 85 B. t. u. per cubic foot which represents about 50% sensible heat in the effluent gases and about 50% due to the heat of combustion of the CO gas which represents about 20 to 25% by volume.

I have devised a system which makes possible the use of air for cooling the effluent gases and for the oxidizing of the carbon monoxide and the metal fumes, although at first, this seemed to be a practical impossibility.

Assuming the use of a 25 ton converter and since converters often blow more than their rating, the amount of air used in the blow may be about 26,000 cubic feet per minute at 60° F. which upon leaving the nose of the converter will be heated to 2700° F. and thus, will have a volume of about 156,000 cubic feet per minute. To lower the temperature of such a volume of gas, I have found that about 300,000 cubic feet per minute of air at 60° F. is needed as applied to a final temperature of about 600° F. It will thus noted that substantially a 2 to 1 relationship is needed (300,000 divided by 156,000). This average temperature has been found to be safe, since neither radiation nor wind factors were considered. I have found that the calculated volume of about 300,000 cubic feet of air at 60° F. will satisfy the requirements, provided that the air is aspirated or sucked into the cooling chamber of the converter enclosure and drawn out through each cleaner 123 with the effluent gases of the converter. In this connection, I employ two exhaust fans 125, one in each outlet from the cleaners which are capable of drawing 700,000 cubic feet per minute at 600° F., whereas the final volume of gas leaving the chamber need not be more than about 660,000 cubic feet per minute at the 600° temperature.

It will not be noted that I have determined that the air introduced into the chamber of the enclosure 10 should be aspirated or suction air as contrasted to blown-in or positive pressure air. Also, in accordance with my invention, a goodly portion of make-up air is taken into the enclosure 10 through louvers **63*a*** (see Figure 1) which are located above the converter at the same end of the enclosure as that at which the converter is located, so that such air will be drawn in by suction applied from an opposite or opposed end and produce a cross-flow above the converter between the louvers and the exhaust to the cleaners, the latter of which are located at a remote position with respect to the converter. A portion of the make-up air may be drawn in through the bottom of the enclosure 10; it is also controlled by exhaust fans 125 (see Figure 1A) to meet requirements of the system.

In this manner I, in effect, automatically proportion the requirements for outside air to the operation of the converter, to the operation of processing and cleaning the effluent gases, and to an effective cooling down of such gases to produce a combined fluid or a gaseous flow having a much lower temperature and one at which the cleaning apparatus can effectively operate and without damage to its parts. Also, the flow of cooled gases to the cleaning apparatus is proportioned to the cooling action in the enclosure, so that gases entering the cleaning apparatus have a temperature of not greater than about 600° F.

The gases discharged from the converter also include considerable dirt consisting of metalloids, graphite, etc. which must be eliminated. The majority of the heavier dirt particles in the gas of the converter will settle on the floor of the enclosure, due to the flow control and segregating action of remotely positioned baffling, while medium weight particles will, as they separate out by the converter gas expansion, cooling and mixing action in the chamber, also settle towards the floor. Finer particles are removed by cleaners 123 and their secondary separators 130 (see Figure 3). I have provided an arrangement such that direct flame from the converter 15 (see Figure 1) will not strike walls of the enclosure 10 and thus avoid damage to them, particularly from the standpoint of roughening encrustations. In this connection, I have discovered that if relatively smooth surface sheathing plates are employed as interior facing for the inside of the enclosure 10, medium weight particles may accumulate to a certain extent thereon, but when slightly accumulated, will fall as built up large particles towards the floor. Thus, the need for periodically scraping or vibrating off such particles is not inherent in the employment of my system. The system is such that all of the gases and fumes from the converter are fully cleaned before they are discharged to the atmosphere and valuable metal compounds are recovered.

It is customary after the converter charge has been deposited in the ladle and while it still is on its side to blow air therethrough before it is again turned to an upright position and employed. This blowing-out produces considerable smoke and fumes which will also be handled by the system and will not escape to the atmosphere.

In carrying out my invention, I provide the cleaning enclosure or building 10 which is substantially fully enclosed about its sides, ends, and top or ceiling by means of steel inner and outer plate lining portions or sheathing. The bottom portion is provided with spittle collection hoppers for relatively larger size materials which are thrown off from the converter during the operation of blowing, see position *b* of Figures 1, 2 and 5, and for medium size particles that are separated out from the fumes and gases in the chamber defined by the enclosure 10. The enclosure 10 is positioned on a structural framework above a normal level of a foundation or floor 11 to provide operating spacing for the discharge and collection of separated-out materials, for ready maintenance and repair of the converter, etc., and for moving a ladle car into and out of a pour-receiving position with respect to the converter.

As to a chamber defining size of the enclosure, by way of example, I have determined that one having a width of about 50 feet, a length of about 90 feet and a height of about 70 feet is fully adequate for the requirements of a 25 ton converter. An enclosure of these general dimensions will thus work satisfactorily with converters of a 25 ton or smaller size and for overloads on a 25 ton converter. A proportionate increase in size of the enclosure 10 can be employed for converters of up to 60 tons or more capacity.

A tiltable Bessemer type of converter 15 (see Figure 1) is mounted on a buggy, truck or carriage 18 for movement into and out of the enclosure 10 and for normal positioning within a primary chamber defined by the enclosure 10 and adjacent its front end, while it is being charged, see position *a* of Figures 6 and 7, while it is being blown, see position *b* of Figures 1, 2 and 5, and while it is pouring metal, see position *c* of Figure 8. The converter 15 is shown as of a bottom-blown, turnable type, see for example, my United States Patents Nos. 2,483,017 of September 27, 1949, and 2,485,305 of October 18, 1949, but is constructed so that the blowing air may be introduced from one of its axle shafts (see Figures 4 and 4A) and while it is positioned on the buggy 18. In addition, it is provided with an oblique nose which as shown in Figure 1, inclines towards the central portion of the chamber defined by the enclosure 10 when the converter 15 is in its upright or blowing position *b*, to direct the flame substantially centrally of the chamber and towards an exhaust or upper, baffled, back end portion thereof, see the baffling 110, 112 and 114 of Figure 1A.

The enclosure 10 has a front, refractory-reinforced door 86, see particularly Figure 11, which is raised and lowered by drums 78 and 78′ (see Figure 4) of an operating mechanism that is mounted in a maintenance house 69 (see Figure 1). The door 86 permits inspection of the enclosure 10 and permits the converter 15 to be removed therefrom for repair and maintenance when it is in the substantially horizontal position of Figure 6 and after a converter-charging apparatus 40 has been moved out of the way. The door 86 is normally employed when the converter is being charged with scrap and hot metal, utilizing mechanism of the apparatus 40, see Figures 5 to 7, inclusive.

I have shown cleaners 123 at the discharge end of the enclosure 10 that are of a so-called tubular or cell type of concentrator and which are separated from the primary enclosure chamber by suitable heat and gas-diversion baffling, see 110, 112, 114, etc. Heretofore, a concentrator of this type has to my knowledge only been used and was designed primarily for use as a precipitator for fly ash laden gases in connection with boilers, see American Blower Corporation Bulletin 1628 of 1947, relating to a series 361 precipitator. However, I have found such an apparatus to be highly effective in a system employing the principles of my invention. In utilizing such a precipitating or concentrating apparatus, I do not leave its bottom or discharge end portions open, but connect the end portions with induced draft exhaust fans or blowers 125 which are employed to aspirate air into the chamber of the building 10 and as employed, are important in carrying out my invention. The cleaned gases are then drawn off into the bottom of a stack 128 from which they may be discharged into the atmosphere, see Figures 1A, 2 and 3.

The cleaner or concentrator units 123 are composed of tubes or cells enclosed in a sealed casing to, when the casing is removed, give an end appearance of a honeycomb. Each tube or cellular assembly consists of a relatively large diameter inlet tube extending substantially horizontally along the casing, a spinner element to produce spiral movement of gas flow through the tube, and a smaller diameter outlet tube open to and centered by a peripheral orifice in axial alignment with an open end of the inlet tube. Particle laden gases entering the tube assembly are forced radially-outwardly of the walls of the inlet tube by the spinner and the particles being heavier tend to move out through the open orifice or joint between the inlet and outlet tubes from which they discharge into the duct 131, see Figure 3 of the drawings. In other words, there is a common chamber surrounding the orifices of the inlet and outlet tube assemblies which serves to feed particles downwardly to the duct 131. The gases enter the inlets of the cellular or tube assemblies through the breaching or connection housing 120 shown in Figures 1A and 2.

Referring particularly to Figure 4, the enclosure 10 is mounted on the foundation or floor 11 and on one side near its front end, see also Figure 4, has a control house 12 and a control table 13 and a heat-resistant sight-window door 14 to the interior of the chamber, so that an operator, as diagrammatically shown, may observe the operation of the system while centrally controlling its operation. The controls are illustrated in Figure 15 and are of readily available commercial construction.

As shown in Figures 1, 4, 4A and 5, the converter 15 has at its opposite ends horizontally extending stud shaft portions **15*a* and 15'*a* which are carried in journals 16 and 16', respectively, of journal stand supports 17 and 17'. The wheeled buggy or converter carriage 18 securely mounts the stand supports 17 and 17' and has wheels 21 and 21' adapted to roll longitudinally along side pairs of rails 22 and 22', see particularly Figure 4. Air for blowing the converter is supplied to an air blast or wind box or header 24 through a gasketed (bolted) break joint 25 by a supply pipe 26. The box or header 24 supplies air to hollow bore 15*b* of the stud shaft 15*a*, see Figures 1, 4 and 4A, and from an inner end of such hollow bore, through a transverse opening 15*c*, to a side conduit or pipe connection 26' which at its delivery end is connected to a wind box or header 15*d* of conventional construction for supplying air to tuyere openings. Side shield plates 31 and 31' are secured on the buggy 18 and extend vertically-upwardly therefrom in an opposed relationship along the inside portions of the stands 17 and 17' and along the converter 15 to protect the mechanism from the high temperature of the converter. The converter 15 is turned arcuately to its various operating positions (see Figures 6 and 8) through its stud shaft 15'*a*, speed reducing gear boxes 19 and 19' (see Figures 4 and 5) and reversible electric motors 20, all of which are mounted on the carriage or buggy 18. As shown in Figure 15, the motor moves the converter 15** between charging, blowing and dumping positions *a*, *b* and *c*.

The right-hand rail pair 22 for the converter buggy 18, see Figures 1, 4, 5, 6 and 14, is mounted on longitudinally-extending support channels **23*a* that are carried by a series of longitudinally spaced-apart structural stands 23, see also Figure 5. The stands 23 rest upon the foundation 11 and are of minimized dimension to provide a maximum of both transverse and longitudinal working space beneath the building or enclosure 10. In a similar manner, the left-hand rail pair 22' is carried on longitudinally-extending rail support channel structures 23'*a* which are in turn mounted on the foundation 11 by a series of longitudinally spaced-apart structural stands 23'. Stands 23 and 23' as shown, define intermediate transverse and longitudinal spacing along and beneath the structure and are preferably transversely aligned to maximize the available working space beneath the enclosure 10**.

As shown in Figures 1, 5 and 6, I have provided a converter buggy drag-out 27 which is securely mounted within the enclosure. As shown particularly in Figure 5, an electric motor 28 is mounted on the drag-out structure 27 and is connected through a sprocket and chain mechanism **28*a* to a drag-out drive shaft 28*b*. Right and left bearing supports 27*a* and 27'*a* extend vertically from the structure of the drag-out 27 to journal the shaft 28*b*. Cable drums 28*c* and 28'*c* are secured on the shaft 28*b* at opposite or right and left-hand end portions thereof for rotation therewith. The right-hand drum 28*c* carries an interleaving cable 29, while the left-hand drum 28'*c* carries a similar cable 29'. As shown, the construction on the right and left-hand sides is the same and the respective structural stands 23 and 23' (see Figures 1, 5 and 6) carry idler guide pulleys or rollers 30 and 30' (see Figure 5) over which the respective cables 29 and 29' pass. Each cable 29 and 29' extends from its respective drum 28*c* or 28'*c* along and beneath the support channels 23*a* or 23'*a*, along the front of such channels, and then backwardly along the top of such channels to connect to the front end of the converter buggy 18. At their opposite ends, respective cables 29 and 29' (see Figure 6) are connected to the back end of the buggy 18 after leaving over their respective drums 28*c* and 28'*c*. It is thus apparent that a clockwise rotation of the shaft 28*b* will move the buggy 18 outwardly on its rails with respect to the enclosure and an opposite or counterclockwise movement will move the buggy 18** inwardly along its rails and towards the furnace door opening.

In Figures 1, 2, 5 and 8, I have shown a hot metal ladle 35 which may be of 75 ton capacity and that is positioned for moving it from a metal-receiving to a metal-pouring position on a wheeled buggy or carriage 36. The ladle has trunnions **35*a* on its opposite sides to receive crane hooks 51*a*, see Figure 1. Rails 37 extend longitudinally of the foundation 11 for guiding the wheels of the buggy 36 during its movement from a position outside of the enclosure to a metal-receiving position beneath the enclosure, see the dotted line position to the right of Figure 1 and the full line position of Figure 8. As shown particularly in Figure 8, in its inner position, the ladle 35 is beneath a mouth 15*e* of the converter to directly receive metal therefrom when the converter 15** is in its pouring position *c*. The carriage or buggy 36 is moved in and out in a manner similar to the converter 15. In this connection, see the drag-out structure 38 of Figures 1 and 5 having a reversible motor **38*a* which drives a cable drum 38*b* and cable 39 in clockwise and counterclockwise directions. The interleaving of the cable 39 over guide or idler pulleys 11*a* (see Figure 1) and the connection of its one end to the back end of the carriage 36 and the connection of its other end to the front end of the carriage 36 is such that a clockwise movement of the drum 38*b* will cause the front end of the cable to move the carriage or buggy 36 forwardly or outwardly and a reverse or counterclockwise movement of the drum will cause the opposite end of the cable 39 which is connected to the back end of the buggy 36 to move the buggy inwardly towards the enclosure 10. The pulleys 11*a* have a mounting structure which is positioned within the foundation 11**.

In Figures 1, 2, 5, 6 and 14, I have shown a charging machine or mechanism 40 for the converter 15. This mechanism is carried on a buggy **40*a* having flange wheels 41 that engage rails 42. As shown particularly in Figure 14, the rails extend transversely of the structure and are mounted on a frame structure 43 that is removably bolted above and across the rail structures 23*a* and 23'*a*, so that the charging mechanism 40 may be completely removed from the front end of the enclosure 10 when the converter 15 is to be moved forwardly out through the furnace charging opening. The buggy 40*a* (see Figure 14) is moved transversely along the front of the charging opening of the furnace by a double-acting fluid motor 44 whose piston rod 45** is at its outer end pivotally connected to the buggy.

The buggy **40*a* (see Figure 14) has a pair of chute supporting stands 46 and 46' for a hot metal runner chute 49 and a scrap-chute 49'. Each of these chutes is, as shown particularly in Figures 6 and 14, pivotally mounted on their respective stands 46 and 46' by hydraulic tilting devices 47 and 47'. The devices 47 and 47' are of commercial hydromotor construction (see, for example Bulletin 21 of The Bonnot Company of Canton, Ohio), and are adapted to tilt the respective chutes about their stands 46 and 46'. As shown in Figure 7, the molten metal chute 49 may be moved to an inclined substantially horizontal position to receive molten metal from a crane-supported ladle 50 and guide the metal through the charge opening of the enclosure 10 into the mouth of the converter 15** when the converter is in its charging position *b*. The chute 49 may be moved to a raised, substantially vertical, inoperative position when it is not being used, see Figure 1.

As shown particularly in Figure 6, the scrap metal chute 49' may be also tilted to a substantially horizontally inclined position to charge scrap into the open mouth of the converter 15 after the carriage 40*a* has been moved further to the right along its tracks until this chute is in alignment with the converter, see also Figures 2 and 5. As shown in Figure 1, an overhead rider beam crane structure 51 is provided at the front of the enclosure for handling metal used and processed by the converter. The crane 51 has a chain and ladle hook means 51*a* for carrying scrap boxes, metal ladles, etc. As shown in Figure 1, the beam of the crane may, at its one end, ride on a track 51*b* that is carried on an outwardly-extending support portion 51*c* of the frame structure of the enclosure 10.

The enclosure 10, as shown particularly in Figures 2 and 5, has vertically-extending side and front end, sheathing-supporting I-beams 53 in a horizontally spaced relationship along its sides. Also, as a part of its frame structure, the enclosure has front corner I-beam pairs or columns 52*a*, side beams or columns 52, and I-beams or columns 52*b* at its back corners and intermediate the transverse extent of its back end. These main columns or support beams extend upwardly from the foundation 11, while the sheathing-support or secondary beams 53 extend from a floor level of the enclosure itself, see Figures 1A, 3 and 4.

Inner, side-enclosing lining or plate sheathing 54 is secured to the inner flanges of the side members 53 upon which they are supported, and a similar lining 55 is secured to the inner flanges of the front members 53. As shown in Figures 1A, 2, 3 and 5, the upper portion of the back side of the enclosure 10 is closed-off by shaped corner sheathing 56 and shaped connecting sheathing 56*a* in co-operation with housings of the cleaners 123. The shaped sheathing 56 is carried by an upper cross beam 106 (see Figures 1A and 3) and the intermediate-shaped sheathing 56*a* is carried by the beam 106 and one of the columns 52*b* (see Figures 1A, 2 and 3). Inner sheathing or lining 56*b* closes off the lower and major portions of the back side, see Figure 1A. The back sheathing 56*b* is carried by the column members 52*b* and by cross beam 107, see Figures 1A and 3. It will be noted that the inner side lining 54, the inner front lining 55, as well as the inner back lining 56, 56*a* and 56*b* are formed into a unitary structure as by welding. Outer front end sheathing 68, outer side sheathing 167, and outer back end sheathing 169 is also mounted on the sheath-supporting beams 53 to define an insulating air spacing with the inner sheathing. It will appear that the structural framework for the enclosure 10 is provided by relatively widely-spaced, vertical columns, 52, 52*a* and 52*b* of I-beam construction.

As shown particularly in Figures 1, 1A, 3 and 4, horizontally-extending ceiling or rafter I-beam members 58 support a ceiling lining or inner sheathing 57 on their inner flanges. Along the line, some of the members co-operate with columns 52 (see Figure 2) to serve as bridge girders. In this manner, a substantially rectangular enclosure is provided. The roof and ceiling framing is supported, see Figure 4, by longitudinally-extending I-beams of caps 61 and 61′. The outer beams 61 are secured to and rest upon the vertical columns 52, 52*a* and 52*b* and side beams 53. The intermediate beam 61′ (see Figures 1 and 1A) is supported at its front end by struts 63 (see Figure 4) and at its rear end by center column 52*b* (see Figure 3). Also as shown in these figures, I have provided a sloped roof of a gable type which is supported by transversely extending channel members 59 and longitudinally extending angle members 59*a* and whose inner flanges support an inner sheathing or lining 60 and whose outer flanges support an outer sheathing 60*a*. The sides of the roof are enclosed by side sheathing and lining 54′ and for ventilating purposes, is provided with louvers 54′*a* on opposite sides of its peak. It will thus appear that the building 10 is substantially fully enclosed along its sides, ends and top to define a treating chamber for the gaseous exhaust of the converter 15.

Referring particularly to Figures 4 and 5, it will be noted that the control 12 is mounted on a right-hand corner column structure 52*a* and adjacent side beams 53. It will be noted that each front corner column pair 52*a* is secured together to form a unitary structure by a vertically extending cross web 52′*a*, see Figures 2 and 5.

A maintenance house 69 is shown in Figure 1 as mounted on a platform 65 which is, in turn, supported on a pair of transversely-extending front I-beams 64 which extend between and are secured at their opposite ends to the corner columns 52*a* and webs 52′*a*, see particularly Figures 1, 2 and 4. The exterior front wall sheathing 68, as shown particularly in Figures 1 and 2, projects downwardly along the enclosure 10 and is connected to the maintenance house 69. Louver 68*a* is provided in the sheathing 68 for drawing in air to the chamber enclosure 10.

Below the openings of the louver 68*a* (see Figures 4, 9 and 10), there is a passageway or opening 98 in the inner front sheathing 55. The sheathing 55 is reinforced above and below the opening 98 by transverse channel members 93 and 94. An integral, angularly-outwardly-upwardly-inclining lower portion 55*b* terminates in an inwardly-upwardly-inclining integral shelf portion 55*c*. The portion 55*c*, with downwardly-outwardly-declining integral portion 55*a* of the upper portion of the sheathing 55, defines a relatively narrow transverse width of opening 98 along the front of the enclosure. The bend or joint between the portions 55*b* and 55*c* is reinforced by a transversely-extending angle piece 95.

A series of transversely-positioned, adjustable shutter members 96 is carried by the shelf or end portion 55*c*; bolt and nut assemblies 97 extend through holes in the portion 55*c* and co-operate with slot pairs 96*a* located adjacent opposite end portions of each of the shutter members 96, see Figures 9 and 10. As a result, the shutter members 96 are adjustably secured by the bolt and nut assemblies 97 to provide a desired width of passageway 98 with the angle-shaped, downwardly extending, sheathing portion 55*a*.

A baffle plate 99 is positioned to extend transversely along and behind the opening 98 in a substantially parallel plane with respect to the portions 55*a* and 55*c* which define such opening and in a spaced relationship to provide, as shown by the arrows of Figure 9, an upward flow path for aspirated air. The baffle plate member 99 is secured in position by a series of transversely spaced-apart and vertically-extending side members 100, each of which is reinforced by an intermediate strip 101 and by a slide strip 102. It will be noted that the side members 100, in effect, divide the baffle plate 99 into a series of compartments and further, that fluid flow along the passageway is defined by the baffle plate 99 which has a relatively small or restricted bottom opening and a relatively larger or diverging top opening (see Figures 1, 9 and 10). This facilitates the suction action which is induced by fans of the cleaner section. The cleaner section is located in a substantially opposed longitudinal end position with respect to the entry passageway 98, see particularly Figures 1 and 1A.

As shown in Figure 4, angular strut members 63 are secured at their apex to the intermediate ceiling beam 61′ and their lower end portions are secured to outer members of the front end column pairs 52*a*, and to the transverse or cross beam 64 to reinforce and support the platform 65, see Figure 1.

As shown particularly in Figures 1, 4 and 11, the furnace door 86 is adapted to be raised and lowered with respect to the lower front end portion of the furnace to open and close the charging opening therein. This door 86 carries a vertically-extending layer of refractory facing on its front face and is removably positioned within a structure consisting of a side, top and bottom channel framework 75, transversely-extending intermediate reinforcing H-beam sections 75*a*, and an upper transverse or cross piece 75*b*. The top portion of the frame 75 has a series of vertically spaced-apart mounting hooks 86*a* that are adapted to latch over an inner flange of the beam sections 75*a* and over the cross piece 75*b*. The door structure 86 is provided with a pair of transversely spaced-apart cable mounts 76 through which raising and lowering cables 77 and 77′ are mounted.

The cables 77 and 77′, as shown particularly in Figure 4, are operatively positioned on drums 78 and 78′, respectively, at opposite ends of a drive shaft 78*a*. The shaft is driven by a reversible electric motor 79 through shafting and a gear reduction unit 80. The cable 77 is guided by pulleys 82 and 83 towards the left-hand side of the frame structure and is connected at its outer end to a counterweight 84. In like manner, the cable 77′ interleaves with pulleys 82′ and 83′, behind the pulleys previously mentioned, see particularly Figures 1 and 4, and carries a counterweight 84′. It will thus be apparent that rotation of the motor 79 in a clockwise direction (when facing the right-hand side of Figure 4) will cause the cables 77 and 77′ to raise their respective weights 84 and 84′ and permit the furnace door 86 to close. A counterclockwise movement of the motor 79 will be aided by the counterweights 84 and 84′ and will cause the door 86 to be raised to an upper or furnace-charging position.

As shown particularly in Figures 4, 5 and 11, the door 86 is guided in its movement by side-framing channels or vertical guide members 70. The members 70, as shown particularly in Figures 4 and 11, have inwardly-projecting flanges and are secured in position between transverse members 64, 66 and 88, an upper pair of channel pieces 70*a*, and lower pairs 70*b*. At their lower end portions, the door guide members 70 are secured to short length cross members 71, see Figure 4.

Adjacent the upper portion of the charging opening, as shown particularly in Figure 11, I have reinforced the side sheathing 55 by the transversely extending I-beam member 88 which with the outer member 66 also serves as a spaced guide for the furnace door 86 and reinforces a scraper mounting to be described. I provide a stepped baffle construction for protecting the scraper and its mounting which, as shown, consists of a downwardly-inwardly projecting plate 89 that projects from the sheathing 55 and a downwardly-outwardly projecting plate 90 which plates are secured together and to the sheathing as by welding.

A scraper 91 is pivotally mounted on a transverse shaft 92 and has a lower scraper edge 92*a* to contact the inner refractory face of the door 86 during its up and down movement and maintain it in a clean condition. The upper portion of the scraper 91 is counterweighted from the shaft 92, in order that its cleaning edge 92*a* will always be urged to bear against the refractory facing 87 of the door. The plate members 89 and 90 protect the scraper 91 and its mounting from direct heat.

Figure 3:
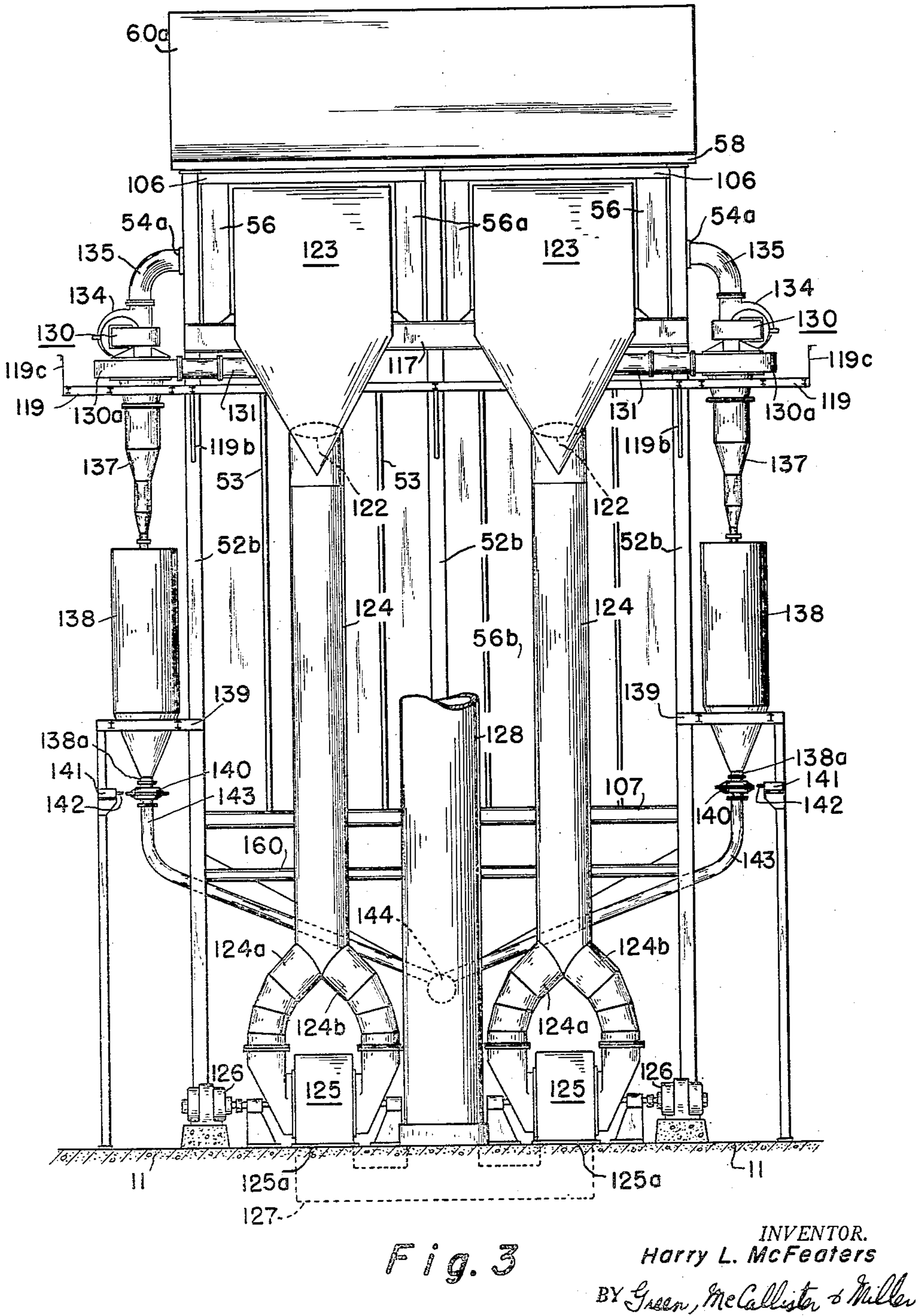
Figure 3 is a back end view in elevation on the scale of Figures 1 and 1A and taken in the direction of the lines III—III of Figures 1A and 2.

The gases, after cooling in the main or primary chamber of the enclosure 10, leave such chamber through a pair of upper openings in its back end portion, as shown particularly in Figures 1A and 2, and through such openings through cleaners 123 and down piping 124, see also Figure 3. To protect and isolate the cleaners 123 from direct heat of the primary chamber of the enclosure 10, I provide a baffle structure, as shown particularly in Figure 1A, which projects for the full transverse extent of the enclosure and which consists of a lower baffle plate member 110, an upper baffle plate member 112, and an intermediate baffle plate member 114. Each of these baffle members faces the chamber of the enclosure 10 and together, define a secondary chamber behind the primary chamber.

As shown in Figure 1A, the lower baffle member 110 defines passageways *d* and the upper baffle member 112 defines passageways *e* with the intermediate member 114. As shown particularly in Figures 12 and 12A, the lower member 110 has a series of transversely spaced-apart and vertically-extending I-beam pieces 111 that reinforce it vertically, that are secured between it and the member 114, and that provide a series of restricted vertical passageways *d* between it and the member 114. In a like manner, see Figure 12B, the upper member 112 has a series of transversely spaced-apart and vertically-extending I-beam pieces 113 that reinforce it vertically, that are secured between it and the member 114, and that provide a series of restricted vertical passageways *e* between it and the member 114. The members 110, 112 and 114 each have side flanges 110*a*, 112*a*, and 114*a*, see Figures 12, 12A and 12B, that secure them at their ends to opposite inner side sheathing 54 of the enclosure 10. The member 112 also has a top flange 112*b* that is secured to the ceiling sheathing 57, see Figure 1A. An inwardly-bent bottom lip 112*c* of the member 112, see Figures 1A and 12A, is employed to restrict fluid flow into passageway *e* and to favor flow into passageways *d* and *f*.

The intermediate member 114 has a series of transversely spaced-apart and vertically-extending I-beam pieces 115 that are secured to it, and that reinforce it vertically, see Figure 12. The pieces 115 are in turn secured as by welding to horizontally extending, relatively heavy, upper and lower supporting cross I-beams 116 and 116′, see Figure 1A. Tie pieces 116*a* and 116′*a* are shown for supplementing the mounting. The cross beams 116 and 116′ are secured at their ends through side sheathing 54 to the frame structure of the enclosure 10 and, in themselves, constitute a frame structure for supporting the assembly of baffle members 110, 112 and 114. It will be noted that the member 110 defines a lower passageway *f* with the inner back sheathing 56*b*.

The secondary chamber behind and defined by the baffling is connected through a ring housing 120, see Figures 1A and 2, to the inlet of each cleaner 123. A pair of transversely extending I-beam members 117, see Figures 1A and 3, support the cleaners 123 and the connecting housing 120, and are mounted on the vertical columns 52*b* by an extension piece construction 118, see Figures 1A and 2. Also, as shown in Figures 1A and 3, inspection platform 119 has bottom bracing 119*b* secured to columns 52*b* and a railing 119*c*.

As shown in Figures 1A and 3, each cleaner 123 has a main bottom gas exhaust opening 122 for clean gas which is connected through a down-draw conduit 124 and branch headers 124*a* and 124*b* to opposite sides of an exhaust fan or blower 125. The blower 125 is mounted on the floor 11 and is driven by an electric motor 126. Each blower 125 has a bottom exhaust outlet 125*a* that is connected through a flow passageway 127 in the shop floor 11, see Figure 3, to an atmospheric exhaust pipe or stack 128.

As shown in Figures 2 and 3, each cleaner 123 also has a side exhaust from its primary cleaner separation chamber which is shown connected by a conduit 131 to the inlet 130*a* of a centrifugal dust collector or secondary separator 130, such as manufactured by the American Blower Corporation, see the previously mentioned catalogue. Dust and dirt particles travel downwardly with a swirling action through bottom portion 137 and the cleaned gas passes out through side exhaust 130*b* of separator 130 into a cleaner vent or induced draft blower 134 and from its exhaust through an elbow conduit 135 and a side opening 54*a* to discharge the gas into the secondary chamber portion of the enclosure 10 which is behind the baffles, see particularly Figures 1A, 2 and 3. The blower 134 is driven through shafting 133 by an electric motor 132, see Figure 2.

The metalloids, metal oxides and other dust particles which fall from the separation chamber of the separator 130 pass through the portion 137 (see Figure 3) which is a funnel-shaped discharge conduit with a swirling motion, downwardly into the top portion of a vertical dust collecting bin or container 138. The dust bin 138 is supported by a frame structure 139 which is mounted on the floor 11 and a corner column member 52*b*, see Figure 3. A blast gate 140 is connected to a funnel bottom end portion 138a of the bin 138 and is opened and closed by reciprocating motion imparted by a fluid motor 141 and its piston 142. The discharge from the gate 140 is carried by dust chute piping 143 (see Figure 1A) through a discharge opening 143a to a common header 144.

Referring particularly to Figures 1 and 1A, the front end floor portion of the enclosure 10 has transversely-extending floor, upper level, I-beams 151 on opposite sides thereof which with longitudinal beams 152 (see Figure 4) and brace members 153, support floor plate structures 150 (see Figures 2 and 4) in a spaced relationship with each other on opposite sides of the converter 15. An observation platform grating 150a, as shown in Figure 2, extends from the door 14 of the operating house 12 and is carried by the right-hand platform provided by the structure 150. As shown in Figures 1A, 2 and 13, a catwalk 164 is provided for inspection of the inside of the enclosure 10.

From the concerter 15, the enclosure bottom is defined by a downwardly-inclined transverse or front end spittle hopper plate structure 155 (see Figures 1 and 2) which at its upper end is secured to the floor plate structures 150, is mounted on transverse I-beam members 154 and 154', and which with an opposed downwardly-declining transverse intermediate plate structure 158 and opposite downwardly and inwardly-declining side plate structures 156, provides or defines a bin having a central discharge opening 157 therein. In like manner, transverse plate structures 155' and 158' (see also Figure 1A) and opposite side plate structures 156' define a second and rear hopper having a discharge opening 157' therein. As shown particularly in Figures 1 and 1A, the plate structures 150 and 155, 155 and 156, 158 and 155', 155' and 156', and 156' and 158' are connected integrally with each other and the structure 158' is also connected to the back facing or sheathing 56b. A lower cross frame structure 159 (see Figure 1A) supports structure 158 and 155' and a lower cross frame structure 160 supports the structure 158'. As shown, the hopper plate structures are refractory lined.

As shown in Figures 1 and 1A, the front hopper opening 157 discharges into the longitudinally-extending header 144 and between spiral spacing defined by a screw conveyor 146 which is operatively positioned to extend therealong. The rear hopper opening 157' has a blast gate 161 which is actuated by a fluid motor 162 through its piston rod 163. It will be noted that a similar blast gate may be provided for controlling the discharge through opening 157, but that, as shown, one (for the opening 157') will be sufficient. Material from the header 144 is discharged through spout 144a into spittle collecting chute cars 165 which are moved into and out of a receiving position on tracks 166 that extend transversely of the floor 11. The conveyor 146 (see Figures 1 and 1A) has a drive shaft 146a which at one end is carried in bearings 145 and at its other and driven end by bearings 145'. A chain and sprocket system 147 is connected to the outer back end of the drive shaft 146a through a gear reduction unit 148 and an electric motor 149, see particularly Figure 1A. The motor and gear reduction unit are positioned on a platform on the frame structure 160.

In Figure 13, I have shown a conventional jack car 167 that may be driven under the converter 15 and hoisted by its hydraulic cylinder to engage the converter shell for removing it. As shown in this figure, the car 167 may also be used to raise a replacement converter bottom 15e (see also Figure 4) into position.

As illustrated in Figure 15, the operations involved in utilizing the system of my invention may be centrally controlled by the operator in the operating house 12, see Figures 2 and 4. This, of course, excludes operations effected by the crane 51 and which are controlled by a crane operator. Although I have shown a somewhat conventional converter vessel 15 of a bottom blow type, it will be apparent that the system is equally applicable for various types of converters, such as those of the side blow or the top blow types. Although the successful and practical utilization of my system depends upon the employment of an appropriate type of cleaner construction, such as commercial type 123 and 130 (see Figure 3), it will be apparent that the system may be used with other suitable types of cleaners as they may become available.

In the system shown in Figure 16 of the drawings, I have been able to effectively lower the air space requirements, I have utilized a waste heat boiler to function dually in cooling the hot gases and in making possible a practical utilization of the heat given off by such gases. I have also illustrated an oxygen lance employed with the converter in such a way that gas volumes are minimized and atmospheric (oxygen-containing) air is not required.

In Figure 16, the converter 170 is of a type similar to the converter 15 except that its nose is illustrated as having a fully vertical construction. Also, a water-cooled oxygen lance 171 is positioned to extend vertically along and substantially axially of the converter 170 to supply oxygen to the converter flame above the converter opening from its nozzle portion 171a. The lance 171 is supplied with oxygen through a header connection 171b. A closed chamber 172 for the converter flame is defined by top wall portion 172a, end wall portions 172b and 172c, and bottom wall portion 172d. The walls are cooled by means of continuous, closed, water tube loops 173, 174 and 175. The lower loop 175 is connected to a lower header of a waste heat boiler 178 and to the vertical loop 174. The top loop 173 is connected to a top header of the waste head boiler 178 and to the vertical loop 174. In this manner, a continuous circulation of cooling fluid is provided about the inner portion of the walls of the chamber 172.

The chamber 172 is shown provided with a transparent window 176 in its front wall portion 172b and the operator in the control house can thus see the operation by means of a reflecting mirror 177.

As will appear, the waste heat boiler 178 is interposed in the flow path of the converter gases and has baffling, so that the gases will flow therethrough in a looped heat transfer path and thence, through a pair of openings in the back wall portion 172c to a pair of cleaners 123. The mounting of the cleaners is not illustrated in this figure, since it is similar to that shown in connection with the previously described embodiment of my invention, see for example, Figures 1A, 2 and 3 of the drawings. I also provide dust, spittle or particle hopper means 179 which feeds to a chute 180. The construction of such hoppers is somewhat similar to the construction of representative hoppers, such as shown in Figure 2 of the drawings, although I divide the hopper means 179 into two parts by a transversely-extending vertical wall portion 179a.

Since air usually contains about 80% nitrogen and about 20% oxygen, I have found that the use of an oxygen lance reduces the volume of gas to be handled by the chamber 172 by about $4/5$. This makes possible a material reduction in the size of the chamber as also does the use of the closed tube waste heat boiler installation. I have determined that such a boiler will effectively reduce the temperature of converter gases well below a gas temperature (not above about 600° F.) at which the dust collectors 123 may effectively operate and a relatively large volume of cooling air is no longer needed for this purpose.

It will be apparent that in accordance with my invention, the converter 15 is positioned beneath the enclosure 10 and its gas expansion, mixing and cooling chamber in such a manner that all of the flame, gas and smoke discharged from the converter will be introduced into the enclosure and thus, segregated from the ambient or surrounding atmosphere. The cooling action is effected by the expansion of the converter gases within the chamber and the mixing of a controlled, baffled, upward flow of atmospheric air into the enclosure and in the case of the modified embodiment, by a closed tube cooling means and heat-absorption baffling.

The location of the gaseous discharge-receiving opening to the enclosure 10 is such that the converter flame cannot directly impinge on the inner facing of the enclosure, but only upon the gaseous atmosphere of the enclosure. The operation of the cleaners at the remote and segregated upper outer end of the enclosure (which end has, in effect, a secondary or cooled gas receiving chamber area by reason of the baffling), is directly proportioned to the cooling action of the gases in the enclosure so as to provide a flow of mixed and cooled gases to the cleaning apparatus that is not in excess of about 600° F. This induced flow is effected by the suction blowers 125.

It will be further noted that the gaseous discharge from a secondary portion of the cleaning or separating apparatus has a return flow through openings 54*a* into the segregated or secondary chamber area of the enclosure.

What I claim is:

1. In a converter layout, the combination of a structural framework, a relatively smooth facing mounted on said framework and defining a gas cooling and expansion chamber, a converter having a mouth open through a bottom portion of said enclosure to discharge its flame and contaminant-laden gases into said enclosure, particle-collecting means along a bottom portion of said enclosure, means turnably-positioning said converter for moving its mouth from a charge-receiving to a gaseous blowing and then to a pouring position, means operatively positioned for feeding metal to such converter when it is in a charge-receiving position, means mounted on said framework in operative association with said enclosure to cool gases therein that are discharged from the mouth of said converter, at least one outlet open through an upper end portion of said enclosure, baffling means directing cooled gases from said enclosure through said outlet, and cleaning apparatus operatively connected to said outlet to receive the cooled gases therefrom and separate particle contaminants from the cooled gases.

2. In a system for cloaking the flame of and processing a hot-blown, gaseous, contaminant-laden discharge from the mouth of a generator such as a converter, the combination of an enclosure defining a gaseous discharge-receiving expansion and combustion-supporting chamber therein, an inlet in a lower portion of said enclosure and through which the mouth of the generator substantially fully discharges, said inlet being positioned to space the gaseous discharge from and prevent flame impingement on the interior of said enclosure, means supplying oxygen-containing gas to said chamber in sufficient quantity to support the combustion of highly combustible portions of the gaseous discharge within said chamber, an outlet in an upper portion of said enclosure, baffle means positioned to segregate said outlet in a horizontally-offset relationship with respect to said inlet and the gaseous discharge from the mouth of the generator, means effectively cooling the effluent gaseous discharge and settling-out contaminant particles therefrom within said chamber while moving the gaseous discharge toward said outlet, cleaning apparatus connected to said outlet to receive cooled gases from said chamber, means inducing a flow of the cooled gases through said cleaning apparatus in accordance with the cooling action of said cooling means such that gases entering said cleaning apparatus have a temperature of a maximum of about 600° F., an atmospheric air intake positioned in an upper portion of said enclosure in a remote location with respect to said outlet, and said flow-inducing means being a gas suction means operatively connected to said outlet to draw air in through said intake and to draw gases out of said chamber through said outlet.

3. In a system for cloaking the flame of and processing a hot, positively-blown, gaseous, contaminant-laden, full discharge from the mouth of a generator such as a converter having a discharge temperature in the neighborhood of about 2700° F., the combination of an enclosure having relatively smooth side and top interior walls facing and defining a gaseous discharge-receiving primary expansion and secondary combustion-supporting chamber therein, said enclosure having a compartment to substantially fully enclose a converter beneath said chamber adjacent one side wall thereof, an inlet in the lower portion of said enclosure connecting said chamber to said compartment and through which gases discharge from the mouth of the converter into said chamber, said inlet being positioned and said enclosure being constructed to fully space the gaseous discharge from and prevent flame impingement on the interior walls of said enclosure, means supplying oxygen-containing gas to said chamber in sufficient quantity to support combustion of combustible portions of gas discharged within said chamber, baffle means defining an outlet chamber in a horizontally and vertically remotely positioned relationship with respect to said inlet, spittle collector means beneath said outlet chamber and along the enclosure between said inlet and said baffle means, means effectively cooling the gaseous discharge from the generator within said primary expansion chamber to a temperature of a maximum of about 600° F. and settling out contaminant particles from the gaseous discharge on said spittle collector means, said baffle means having restricted passageways to retain the effluent gases within said primary chamber until the gaseous discharge is cooled to said maximum temperature and to thereafter flow the cooled gases into said outlet chamber, cleaning apparatus connected to said outlet chamber to receive the cooled gases therefrom and further removing contaminating particles therefrom, and means effectively inducing an out-flow of the cooled gases from said primary chamber along the passages of said baffle means into said outlet chamber and from said outlet chamber into and through cleaning apparatus.

4. A system as defined in claim 3 wherein, said cleaning apparatus has a primary cellular concentrator connected to said outlet chamber to receive the outflow of cooled gases therefrom, a secondary concentrator is operatively connected to said primary concentrator to receive a particle-concentrated gaseous flow therefrom, a return gas vent is connected between said secondary concentrator and said outlet chamber to return cleaned gas to said chamber, and a disposal unit is connected to said secondary concentrator to receive separated-out particles therefrom.

5. A system as defined in claim 3 wherein a gas return vent is connected to said outlet chamber.

6. In a method for cloaking the flame of and processing a gaseous contaminant-laden discharge from the mouth of a converter, the steps of flowing the gaseous discharge from the mouth of the converter into an atmosphere of an enclosed chamber, expanding and cooling the effluent gaseous discharge within the chamber and settling out relatively large size dirt particles therefrom towards a bottom portion of the chamber, inducing a suction flow of the cooled gases through the chamber and along baffling in an offest relationship with respect to the gaseous discharge from the converter and into a discharge area that is segregated with respect to the gaseous discharge from the converter, concentrating the particle content of the cooled gaseous discharge in a cleaning area that is also segregated with respect to the gaseous discharge from the converter, moving the concentrated particle content as a gaseous flow into another cleaning area that is segregated with respect to the gaseous discharge from the converter and further concentrating the particle content therein, flowing cleaned gases from the other cleaning area into the discharge area, and flowing cleaned gases from the first-mentioned cleaning area into the atmosphere.

7. A method as defined in claim 6 wherein, atmospheric gases are drawn into an upper portion of the chamber and are mixed with the gaseous discharge therein, and the resultant mixture of gases is cooled to a temperature of not greater than about 600° F. before the cooled gases are cleaned.

8. A method as defined in claim 6 wherein, oxygen-containing gas is introduced into the chamber in sufficient quantity to support the burning of the combustible portions of the gaseous discharge within the chamber, and the resultant mixture of gases is drawn over heat-withdrawing passageways before it is cleaned.

9. In a converter layout, the combination of a structural framework, facing mounted on said structural framework and defining a substantially enclosed gas-receiving and expansion chamber, a converter operatively mounted beneath said enclosure and open through a front portion of the framework to discharge gases into said chamber, means supplying oxygen to said chamber to provide a secondary combustion of the gaseous discharge from said converter therein and to cool gases in the chamber, gas cleaning means operatively connected to an upper back end portion of said enclosure for substantially completely separating out particle contaminants from the gases discharged from the chamber, an oxygen-supplying lance operatively positioned in said converter to supply oxygen to gases discharged therefrom into the chamber of said enclosure, and a waste heat boiler operatively positioned within the upper back end portion of said chamber and having baffling for directing gases into said gas cleaning means.

10. In a converter layout, the combination of a structural framework, a relatively smooth facing mounted on said frame work and defining a gas cooling and expansion chamber, a converter having a mouth open through a front end bottom portion of said enclosure to discharge its flame and contaminant-laden gases into said enclosure, particle-collecting means along a bottom portion of said enclosure and mounted on said framework, means turnably positioning said converter for moving its mouth from a charge-receiving to a gaseous blowing and then to a pouring position, means positioned on said framework for feeding metal to said converter when it is in a charge-receiving position, means mounted on said framework in operative association with said enclosure to cool gases therein that are discharged from the mouth of said converter, at least one outlet open through an upper end portion of said enclosure, baffling means directing cooled gases from said enclosure through said outlet, and cleaning apparatus operatively connected to said outlet to receive the cooled gases therefrom and separate out particle contaminants from the cooled gases.

11. A layout as defined in claim 10 wherein an oxygen-supplying lance is operatively positioned in said converter to supply oxygen to gases discharged therefrom into the chamber of said enclosure.

12. A layout as defined in claim 10 wherein a waste heat boiler is operatively positioned within the upper back end portion of said chamber and has baffling for directing gases into said gas cleaning means.

13. In a converter layout, the combination of a structural framework, sheathing on said framework defining an enclosed flame-cloaking and gaseous discharge-receiving enclosure, a gaseous discharge receiving opening in the bottom portion of said enclosure, a Bessemer converter operatively mounted beneath said enclosure and in a substantially aligned position with said opening, an access opening for said converter in a lower front end portion of said framework, means operatively positioned on said framework to feed a metal charge to said converter through said access opening, a buggy carrying said converter, means for turning said converter on said buggy to move it from a charge-receiving to a blowing and then to a pouring position, a metal pour-receiving buggy operably mounted beneath said framework and having means for moving it forwardly and backwardly towards said converter to receive a molten pour therefrom, hopper means mounted on said framework to receive settled-out particles, said hopper means extending along the bottom portion of said enclosure from said gaseous discharge-receiving opening therein, a collector buggy operably positioned beneath said hopper means for receiving particles therefrom, baffling across said enclosure adjacent an upper back end portion thereof, gaseous discharge openings in said enclosure behind said baffling, gas cleansing apparatus connected to said discharge openings, means for introducing oxygen-containing gas into said enclosure, and suction blower means operatively connected to said cleaning apparatus to draw gas out of said enclosure.

14. A layout as defined in claim 13 wherein, a door is operatively mounted on said framework to open and close off said access opening, and said converter buggy has means to move it into and out of said access opening when said door is in an open position.

15. A layout as defined in claim 13 wherein, a control house is mounted on a front end portion of said framework, and controls for operating said charge feeding means, said means for turning said converter, said means for moving said pour-receiving buggy, and said suction blower means are operatively positioned within said control house.

16. In a converter layout, the combination of a framework having an upwardly-positioned discharge gas receiving and expansion enclosure and a lower operating spacing beneath said enclosure, converter operatively positioned for turning movement beneath said enclosure and within said operating spacing, a gas discharge-receiving opening in the bottom portion of said enclosure for a mouth portion of said converter, said gas opening being located adjacent a front end portion of said enclosure, an excess opening in the front end portion of said enclosure in substantial alignment with said gas opening, a furnace door operatively positioned to be raised and lowered over said access opening, tilting metal scrap and molten metal pouring chutes operatively mounted on said framework in front of said access opening to receive scrap and molten metal and charge said converter through said access opening, a hot metal ladle car operatively positioned within said spacing for forward movement into a pour-receiving position with respect to said converter, spittle hopper means along a floor portion of said enclosure to receive settled-out particles from the gaseous discharge of said converter, a baffled opening through an upper front end portion of said enclosure to supply atmospheric air to said enclosure, at least one gas flow outlet through an upper back end portion of said enclosure, baffle means across the upper back end portion of said enclosure in a spaced relation with said gas outlet to segregate said outlet and to direct gases from said enclosure into said outlet, gas cleaning apparatus operatively connected to said outlet to receive effluent gases from said enclosure, said cleaning apparatus having means for separating out remaining dirt particles in the gaseous discharge, means operatively connected to said cleaning apparatus for inducing a gaseous flow therethrough from said enclosure and for inducing an intake of air through said baffled opening, and means connected to said cleaning apparatus to collect dirt particles that are separated out thereby.

References Cited in the file of this patent

UNITED STATES PATENTS

| | | |
|---|---|---|
| 496,235 | Smith et al. | Apr. 25, 1893 |
| 519,220 | Allen | May 1, 1894 |
| 1,505,281 | Nagelvoort | Aug. 19, 1924 |
| 1,896,178 | Kuzel | Feb. 7, 1933 |
| 2,291,222 | Gibson | July 28, 1942 |
| 2,599,139 | Stevenson | June 3, 1952 |

FOREIGN PATENTS

| | | |
|---|---|---|
| 496,235 | Great Britain | June 5, 1908 |

OTHER REFERENCES

Making and Shaping of Steel, U. S. Steel Co., 6th ed., 1951.